(12) United States Patent
Choi (10) Patent No.: US 11,888,646 B2
(45) Date of Patent: Jan. 30, 2024

(54) BATTERY MANAGEMENT APPARATUS AND METHOD

(71) Applicant: LG ENERGY SOLUTION, LTD., Seoul (KR)

(72) Inventor: Ho-Deuk Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/796,930

(22) PCT Filed: Oct. 5, 2021

(86) PCT No.: PCT/KR2021/013630
§ 371 (c)(1),
(2) Date: Aug. 2, 2022

(87) PCT Pub. No.: WO2022/075706
PCT Pub. Date: Apr. 14, 2022

(65) Prior Publication Data
US 2023/0053345 A1 Feb. 23, 2023

(30) Foreign Application Priority Data
Oct. 5, 2020 (KR) .................. 10-2020-0128336

(51) Int. Cl.
*H04L 12/40* (2006.01)
(52) U.S. Cl.
CPC .. *H04L 12/40169* (2013.01); *H04L 12/40071* (2013.01)
(58) Field of Classification Search
CPC ......... H04L 12/40169; H04L 12/40071; H04L 12/40; H04L 29/08; H01M 10/48; G01R 31/36
See application file for complete search history.

(56) References Cited

U.S. PATENT DOCUMENTS

| 5,615,213 A | 3/1997 | Griefer |
| 6,088,596 A | 7/2000 | Kawakami et al. |
| (Continued) | | |

FOREIGN PATENT DOCUMENTS

| CN | 1345518 A | 4/2002 |
| CN | 1618243 A | 5/2005 |
| (Continued) | | |

OTHER PUBLICATIONS

International Search Report (with partial translation) and Written Opinion dated Jan. 19, 2022, for corresponding International Patent Application No. PCT/KR2021/013630.

(Continued)

*Primary Examiner* — Stephen J Clawson
(74) *Attorney, Agent, or Firm* — Morgan, Lewis & Bockius LLP (57) ABSTRACT

A battery management apparatus according to an embodiment of the present disclosure includes: a communication unit configured to output test information related to a battery; and a control unit configured to generate at least one test information related to the battery, select any one communication channel among a plurality of communication channels based on any one of a data amount of the generated test information and a state of the plurality of communication channels, generate a message packet including the test information based on a type of the selected communication channel and the data amount of the generated test information, and output the generated message packet to the selected communication channel through the communication unit.

14 Claims, 3 Drawing Sheets

(56) References Cited

U.S. PATENT DOCUMENTS

| | | | |
|---|---|---|---|
| 6,195,363 B1* | 2/2001 | Nakatsugawa | H04L 12/403 370/455 |
| 6,205,125 B1* | 3/2001 | Proctor | H04W 56/0065 370/328 |
| 6,347,091 B1 | 2/2002 | Wallentin et al. | |
| 6,594,238 B1 | 7/2003 | Wallentin et al. | |
| 10,079,377 B2* | 9/2018 | Rutkowski | H01M 10/486 |
| 2003/0142629 A1 | 7/2003 | Krishnamurthi et al. | |
| 2003/0181211 A1* | 9/2003 | Razavilar | H04W 36/06 455/450 |
| 2007/0047485 A1 | 3/2007 | Gorokhov et al. | |
| 2008/0151828 A1 | 6/2008 | Bjorken et al. | |
| 2011/0317565 A1 | 12/2011 | Krishnamurthi et al. | |
| 2012/0063410 A1 | 3/2012 | Hong et al. | |
| 2014/0062494 A1 | 3/2014 | Lin et al. | |
| 2016/0121816 A1* | 5/2016 | Koo | H04L 12/4013 370/476 |
| 2016/0193936 A1 | 7/2016 | Brochhaus | |
| 2019/0052459 A1* | 2/2019 | Lothspeich | H04L 9/0816 |
| 2019/0074556 A1* | 3/2019 | Onoda | H01M 10/4207 |
| 2019/0079842 A1 | 3/2019 | Chae et al. | |
| 2019/0090307 A1 | 3/2019 | Hayashi et al. | |
| 2019/0097932 A1 | 3/2019 | Buczek et al. | |
| 2019/0129369 A1 | 5/2019 | Song et al. | |
| 2020/0051347 A1 | 2/2020 | Bohl et al. | |
| 2021/0109492 A1 | 4/2021 | Song et al. | |
| 2022/0158255 A1 | 5/2022 | Choi et al. | |

FOREIGN PATENT DOCUMENTS

| | | | |
|---|---|---|---|
| CN | 101167384 A | 4/2008 | |
| CN | 107231314 A | 10/2017 | |
| EP | 3 996 336 A1 | 5/2022 | |
| JP | H11-32378 A | 2/1999 | |
| JP | 3471516 B2 | 12/2003 | |
| JP | 2010-207029 A | 9/2010 | |
| JP | 5059958 B2 | 10/2012 | |
| JP | 5594255 B2 | 9/2014 | |
| JP | 2017-163344 A | 9/2017 | |
| JP | 2019-47413 A | 3/2019 | |
| KR | 10-1573637 B1 | 12/2015 | |
| KR | 10-2016-0027242 A | 3/2016 | |
| KR | 10-2016-0069640 A | 6/2016 | |
| KR | 10-1843189 B1 | 3/2018 | |
| KR | 10-2019-0012718 A | 2/2019 | |
| KR | 10-2019-0029994 A | 3/2019 | |
| KR | 10-2019-0048673 A | 5/2019 | |
| WO | 2017/183244 A1 | 10/2017 | |
| WO | WO-2021060900 A1 * | 4/2021 | G01R 31/382 |

OTHER PUBLICATIONS

Extended European Search Report dated Jun. 28, 2023, issued in corresponding European Patent Application No. 21877957.7.
Office Action dated Jun. 30, 2023, issued in corresponding Chinese Patent Application No. 202180012817.9.
Office Action dated Sep. 5, 2023, issued in corresponding Japanese Patent Application No. 2022-544359.

* cited by examiner

FIG. 4

| Byte | 1 | 2 | 3 | 4 | 5 | 6 | 7 | 8 |
|---|---|---|---|---|---|---|---|---|
| MESSAGE PACKET | PACKET SIZE INFORMATION | PACKET IDENTIFICATION INFORMATION | | | | FIRST TEST INFORMATION | | |
| | CLASSIFICATION INFORMATION | SECOND TEST INFORMATION | | | | CLASSIFICATION INFORMATION | THIRD TEST INFORMATION | |
| | THIRD TEST INFORMATION | | CLASSIFICATION INFORMATION | FOURTH TEST INFORMATION | | | | CLASSIFICATION INFORMATION |
| | FIFTH TEST INFORMATION | | | | CLASSIFICATION INFORMATION | SIXTH TEST INFORMATION | | |
| | SIXTH TEST INFORMATION | CLASSIFICATION INFORMATION | SEVENTH TEST INFORMATION | | | | CLASSIFICATION INFORMATION | EIGHTH TEST INFORMATION |
| | EIGHTH TEST INFORMATION | | | CLASSIFICATION INFORMATION | NINTH TEST INFORMATION | | | |
| | CLASSIFICATION INFORMATION | TENTH TEST INFORMATION | | | | CLASSIFICATION INFORMATION | ELEVENTH TEST INFORMATION | |
| | ELEVENTH TEST INFORMATION | | CLASSIFICATION INFORMATION | TWELFTH TEST INFORMATION | | | | |

FIG. 5

FIG. 6

BATTERY MANAGEMENT APPARATUS AND METHOD

TECHNICAL FIELD

The present application claims priority to Korean Patent Application No. 10-2020-0128336 filed on Oct. 5, 2020 in the Republic of Korea, the disclosures of which are incorporated herein by reference.

The present disclosure relates to a battery management apparatus and method, and more particularly, to a battery management apparatus and method capable of effectively transmitting test information for diagnosing a state of a battery cell or a battery pack.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

Meanwhile, various ECUs (Electronic Control Units) are included in a device equipped with such a battery, and the ECUs communicate with each other to provide information or receive information from other ECUs. Taking a vehicle as an example, various functions and controls are increasing in the vehicle, and in particular, as an electric vehicle equipped with a battery is put to practical use, the amount of data transmitted and received between ECUs is increasing. Accordingly, communication standards and technologies for improving the efficiency of data communication between ECUs have been proposed.

For example, Patent Document 1 proposes an invention capable of improving data reception stability and improving communication speed to improve the traffic load of the CAN bus by changing the data frame structure for CAN (Controller Area Network) communication so that the data amount increases.

However, Patent Document 1 discloses only a configuration in which the side of receiving data changes the reception mode to a high-speed mode or a normal mode depending on whether the data length exceeds 8 bytes. Since Patent Document 1 improves the traffic load only by changing the reception mode, there is a problem that this technique is difficult to be applied to a device such as an electric vehicle in which various information about the battery cell must be provided in real time. That is, according to Patent Document 1, there is a problem that a considerable amount of time may be consumed for data transmission because the transmitting side has to transmit each single piece of information about the battery cell respectively.

(Patent Document 1) KR 10-1573637 B1

DISCLOSURE

Technical Problem

The present disclosure is designed to solve the problems of the related art, and therefore the present disclosure is directed to providing a battery management apparatus and method capable of reducing a transmission time of a plurality of test information by flexibly selecting a communication channel.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A battery management apparatus according to one aspect of the present disclosure may comprise: a communication unit configured to output test information related to a battery; and a control unit configured to generate at least one test information related to the battery, select any one communication channel among a plurality of communication channels based on any one of a data amount of the generated test information and a state of the plurality of communication channels, generate a message packet including the test information based on a type of the selected communication channel and the data amount of the generated test information, and output the generated message packet to the selected communication channel through the communication unit.

The control unit may be configured to calculate a packet data amount required for the message packet based on the data amount of the generated test information and generate the message packet to include packet size information for the calculated packet data amount, packet identification information, and the generated test information.

The packet identification information may include packet type information representing a type of the message packet and test request information for requesting a test for the battery.

The message packet may include a packet size information region in which the packet size information is recorded, a packet identification information region in which the packet identification information is recorded, and a data region in which the generated test information is recorded.

The control unit may be configured to determine the packet data amount based on the data amount of the packet size information, the packet identification information, and the test information.

When the generated test information is provided in plurality, the control unit may be configured to include classification information corresponding to the number of the plurality of test information in the data region so that the plurality of test information are classified from each other.

The plurality of communication channels may include: a first communication channel in which a maximum data amount of the test information capable of being transmitted at once is set to be equal to or less than a predetermined first standard amount; and a second communication channel in which the maximum data amount of the test information capable of being transmitted at once is set to be equal to or less than a predetermined second standard amount that is greater than the predetermined first standard amount.

The control unit may be configured to select the first communication channel among the plurality of communication channels, when the data amount of the test information is equal to or less than the predetermined first standard amount.

The control unit may be configured to select the second communication channel among the plurality of communication channels, when the data amount of the test information exceeds the predetermined first standard amount and is equal to or less than the predetermined second standard amount.

The control unit may be configured to check a state of each of the first communication channel and the second communication channel, compare an estimated transmission time estimated to be consumed for each of the first communication channel and the second communication channel to transmit the test information, and select a communication channel in which the estimated transmission time is short.

The test information may be battery information based on at least one of voltage, current and temperature of a battery cell, or battery pack test information based on at least one of voltage, current, insulation resistance and temperature of a battery pack including the battery cell.

A battery test system according to another aspect of the present disclosure may comprise the battery management apparatus according to an aspect of the present disclosure.

A battery management method according to still another aspect of the present disclosure may comprise: a test information generating step of generating at least one test information related to the battery; a communication channel selecting step of selecting any one communication channel among a plurality of communication channels based on any one of a data amount of the generated test information and a state of the plurality of communication channels; a message packet generating step of generating a message packet including the test information based on a type of the selected communication channel and the data amount of the generated test information; and a message packet outputting step of outputting the generated message packet to the selected communication channel.

Advantageous Effects

According to an aspect of the present disclosure, since a communication channel may be flexibly selected according to a data amount of test information to be transmitted, transmission efficiency for a plurality of test information may be improved.

In addition, according to one aspect of the present disclosure, there is an advantage that the communication channel may be flexibly selected according to the state of each of the plurality of communication channels as well as the data amount of the test information.

The effects of the present disclosure are not limited to the effects mentioned above, and other effects not mentioned will be clearly understood by those skilled in the art from the description of the claims.

BRIEF DESCRIPTION OF DRAWINGS

The accompanying drawings illustrate embodiments of the present disclosure and together with the foregoing disclosure, serve to provide further understanding of the technical features of the present disclosure, and thus, the present disclosure is not construed as being limited to the drawing.

EMBODIMENTS OF THE DISCLOSURE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first," "second," and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

Furthermore, the term "control unit" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
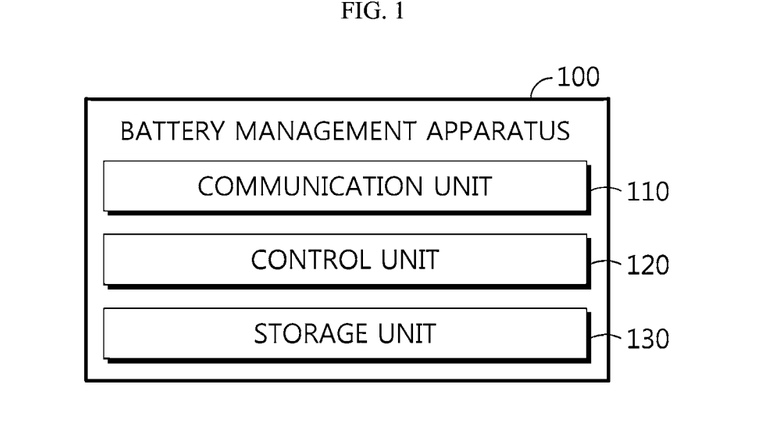
FIG. 1 is a diagram schematically showing a battery management apparatus according to an embodiment of the present disclosure.

FIG. 1 is a diagram schematically showing a battery management apparatus 100 according to an embodiment of the present disclosure.

Referring to FIG. 1, the battery management apparatus 100 according to an embodiment of the present disclosure may include a communication unit 110 and a control unit 120.

The communication unit 110 may be configured to output test information related to a battery.

Here, the battery may be a battery cell or a battery pack. The battery cell has a negative electrode terminal and a positive electrode terminal, and refers to one physically separable independent cell. For example, one pouch-type lithium polymer cell may be regarded as a battery cell. In addition, the battery pack may further include at least one battery cell, a battery management system (BMS), electronic devices (relays, fuses, etc.) and a case.

Preferably, the communication unit 110 may be connected to be able to communicate with a device capable of testing the battery. That is, the battery may be tested based on the test information output by the communication unit 110.

The control unit 120 may be configured to generate at least one test information related to the battery.

Here, the test information may be battery information based on at least one of voltage, current and temperature for a battery cell, or battery pack test information based on at least one of voltage, current, insulation resistance and temperature for a battery pack including the battery cell.

For example, the test information may be state information of the battery cell, such as voltage, current, temperature, SOC (State of charge) and SOH (State of health) for the battery cell.

The control unit 120 may be configured to select any one communication channel among a plurality of communication channels based on at least one of a data amount of the generated test information and a state of the plurality of communication channels.

Here, the plurality of communication channels may be several communication channels capable of transmitting the test information generated by the control unit 120. Specifically, the plurality of communication channels may be a communication channel to which the communication unit 110 is connected to transmit the generated test information to the outside.

Specifically, the control unit 120 may select any one communication channel in consideration of whether the data amount of the generated test information is equal to or greater than a predetermined data amount or whether a part of the plurality of communication channels is already occupied and used.

For example, the plurality of communication channels may include a CAN (Controller Area Network) channel and a CAN FD (Controller Area Network with Flexible Data rate) channel. Here, the CAN channel may be a channel for CAN communication, and the CAN FD channel may be a channel for CAN FD communication.

In addition, the data amount of the test information may be different depending on the number of test factors. For example, the identification information for the test factor may have a size of 2 or 3 bytes, and the value of the test factor may have a size of 2 to 4 bytes. Accordingly, the control unit 120 may calculate the data amount of the test information in consideration of the number of test factors.

The control unit 120 may be configured to generate a message packet including the test information based on the type of the selected communication channel and the data amount of the generated test information.

Both the CAN communication and the CAN FD communication are communication standards designed for ECUs to communicate with each other without a separate host device. Accordingly, the CAN communication and the CAN FD communication are separate communication standards, and the structures of packets used in the CAN communication and the CAN FD communication may also be different.

For example, assuming that the control unit 120 selects a CAN channel among the plurality of communication channels, the control unit 120 may generate a message packet having a packet structure corresponding to the CAN channel. Conversely, assuming that the control unit 120 selects a CAN FD channel among the plurality of communication channels, the control unit 120 may generate a message packet having a packet structure corresponding to the CAN FD channel.

Figure 2:
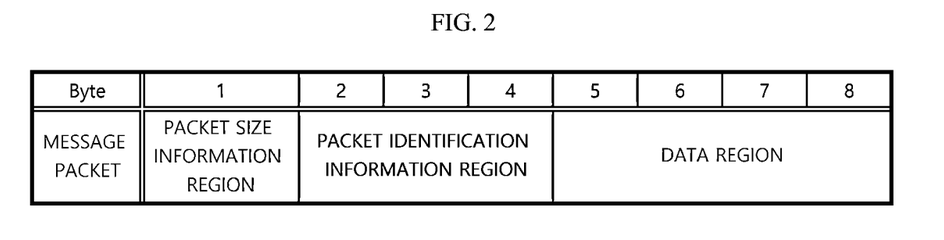
FIGS. 2 and 3 are diagrams showing an exemplary configuration of a message packet that may be generated by the battery management apparatus according to an embodiment of the present disclosure.
Figure 3:
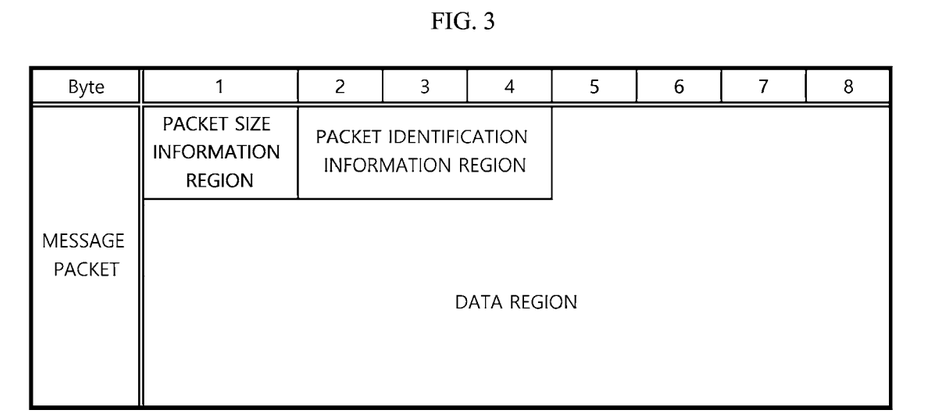

FIGS. 2 and 3 are diagrams showing an exemplary configuration of a message packet that may be generated by the battery management apparatus 100 according to an embodiment of the present disclosure.

For example, when the control unit 120 selects a CAN channel among the plurality of communication channels, the control unit 120 may generate a message packet having the packet structure of FIG. 2. Conversely, when the control unit 120 selects the CAN FD channel among the plurality of communication channels, the control unit 120 may generate a message packet having the packet structure of FIG. 3.

The control unit 120 may be configured to output the generated message packet to the selected communication channel through the communication unit 110.

The message packet generated to correspond to the type of the communication channel selected by the control unit 120 and the data amount of the test information may be a communication packet to be transmitted through the selected communication channel. That is, the control unit 120 may generate a message packet to have a packet structure corresponding to the type of the selected communication channel.

In addition, the control unit 120 may transmit a packet transmission command to the communication unit 110. The communication unit 110 receiving the packet transmission command from the control unit 120 may output the message packet generated by the control unit 120 to the communication channel selected by the control unit 120.

For example, it is assumed that the control unit 120 selects a CAN FD channel and generates a message packet corresponding to the CAN FD channel. When receiving the packet transmission command from the control unit 120, the communication unit 110 may output the generated message packet to the CAN FD channel.

The battery management apparatus 100 according to the configuration of the present disclosure may more quickly provide the test information for a battery by selecting an appropriate communication channel based on the state of the communication channel and the data amount of the test information.

In addition, since the battery management apparatus 100 may be selectively connected to each of the plurality of communication channels, there is an advantage in that it may communicate with the outside through various channels. That is, the battery management apparatus 100 has an advantage of improving the transmission efficiency of at least one test information by selecting an optimal communication channel among the plurality of communication channels.

Meanwhile, the control unit 120 provided to the battery management apparatus 100 according to an embodiment of the present disclosure may selectively include processors known in the art, application-specific integrated circuit (ASIC), other chipsets, logic circuits, registers, communication modems, data processing devices, and the like to execute various control logic performed in the present disclosure. Also, when the control logic is implemented in software, the control unit 120 may be implemented as a set of program modules. At this time, the program module may be stored in a memory and executed by the control unit 120. The memory may be located inside or out of the control unit 120 and may be connected to the control unit 120 by various well-known means.

In addition, referring to FIG. 1, the battery management apparatus 100 according to an embodiment of the present disclosure may further include a storage unit 130. The storage unit 130 may store programs and data required for the control unit 120 to control the battery management apparatus 100. That is, the storage unit 130 may store data necessary for operation and function of each component of the battery management apparatus 100, data generated in the process of performing the operation or function, or the like. The storage unit 130 is not particularly limited in its kind as long as it is a known information storage means that can record, erase, update and read data. As an example, the information storage means may include RAM, flash memory, ROM, EEPROM, registers, and the like. In addition, the storage unit 130 may store program codes in which processes executable by the control unit 120 are defined.

For example, the storage unit 130 may store at least one test information generated by the control unit 120.

The control unit 120 may be configured to calculate a packet data amount required for the message packet based on the data amount of the generated test information.

Here, the data amount of the test information may be a data size of the test information. For example, one test information or a plurality of test information may be generated by the control unit 120, and the control unit 120 may calculate a total data amount of the generated test information.

For example, one test information may include identification information for a test factor and a value of the test factor. The identification information for the test factor may have a size of 2 or 3 bytes, and the value of the test factor may have a size of 2 to 4 bytes. Accordingly, the control unit 120 may calculate the total data amount of the generated test information in consideration of the number of test factors.

The control unit 120 may be configured to generate the message packet to include the packet size information, the packet identification information, and the generated test information for the calculated packet data amount.

Specifically, referring to FIGS. 2 and 3, the message packet includes a packet size information region in which the packet size information is recorded, a packet identification information region in which the packet identification information is recorded, and a data region in which the generated test information is recorded.

For example, the message packet of FIG. 2 may be an 8-byte packet including the packet size information region, the packet identification information region, and the data region. Here, the packet size information region may be a region in which a DLC (Data Length Code) for the total data amount included in the message packet is recorded.

Unlike FIG. 2, the message packet of FIG. 3 may be a 64-byte packet including the packet size information region, the packet identification information region, and the data region.

The packet size information region is a region in which information about the total data amount of the message packet is recorded. For example, the size of the packet size information region may be allocated as 1 or 2 bytes. Hereinafter, it will be described that the size of the packet size information region is fixedly allocated to 2 bytes.

The packet identification information may include packet type information indicating the type of the message packet and test request information for requesting a test on the battery.

For example, the message packet type may include the message packet of FIG. 2 and the message packet of FIG. 3. That is, the packet identification information may include information on whether the corresponding message packet is a message packet for CAN communication or a message packet for CAN FD communication.

Also, the test request information may be information indicating that the corresponding message packet is a message packet that transmits the test information on the battery. For example, the test request information may include an identification code of "0x2E".

In addition, the data region may include test information. The test information may include identification information about the test factor and the value of the test factor.

For example, the message packet of FIG. 2 may include one test information. Meanwhile, the message packet of FIG. 3 may include a plurality of test information.

Also, the control unit 120 may be configured to determine the packet data amount based on the data amount of the packet size information, the packet identification information, and the test information. Thereafter, the control unit 120 may select a communication channel corresponding to the determined packet data amount among the plurality of communication channels, and may select a message packet corresponding to the selected communication channel. In addition, the control unit 120 may record the packet size information, the packet identification information, and the test information in the message packet.

Preferably, when the number of the generated test information is plural, the control unit 120 may be configured to include classification information corresponding to the number of the plurality of test information in the data region to classify the plurality of test information from each other.

Here, the classification information may be dummy data for classifying a plurality of test information. In order for a receiver to easily obtain each of the plurality of test information from the received message packet, the control unit 120 may include the classification information corresponding to the number of the plurality of test information in the data region. That is, the classification information may be a classification identifier for classifying the plurality of test information included in the data region from each other.

Figure 4:
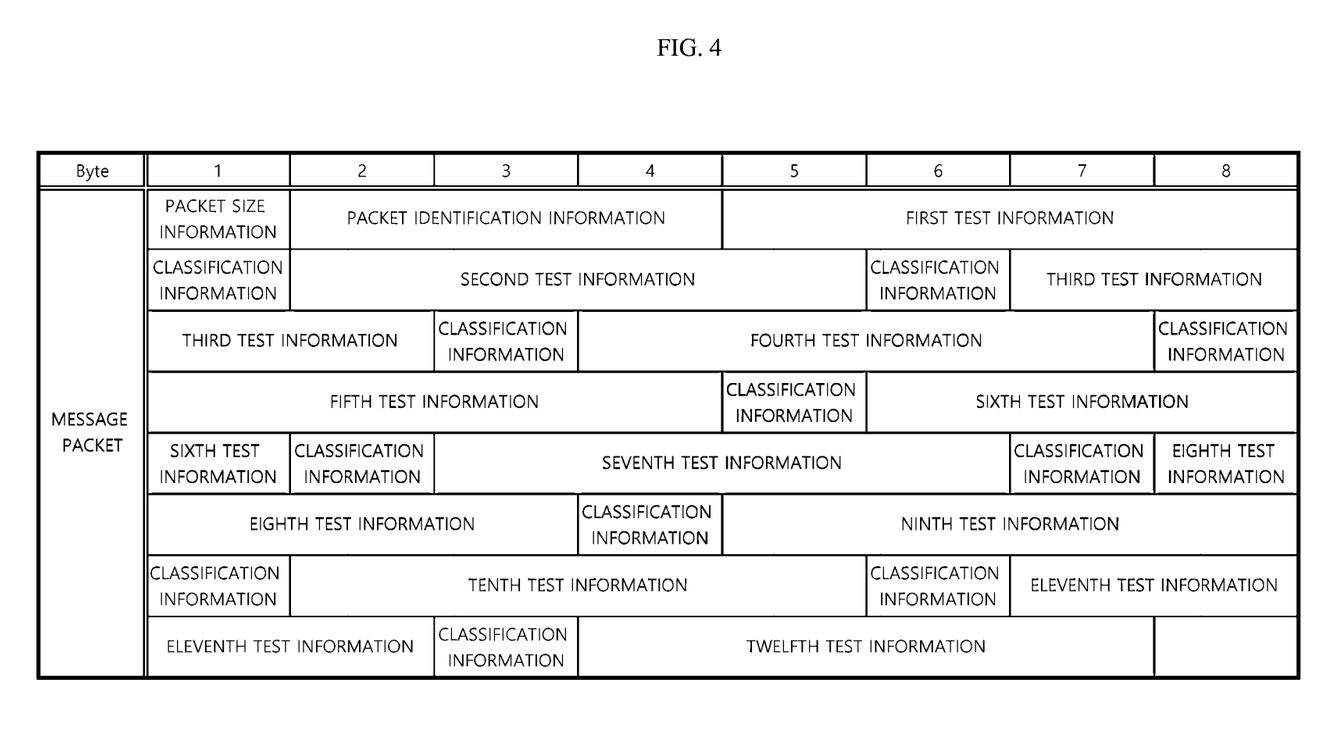
FIG. 4 is a diagram showing an exemplary configuration of a message packet that may be output through a second communication channel.

FIG. 4 is a diagram showing an exemplary configuration of a message packet that may be output through a second communication channel.

Referring to FIG. 4, a total of 12 pieces of test information may be included in the data region of the message packet. In addition, the classification information may be included between the 12 pieces of test information.

For example, if the classification information is not included between the plurality of test information, a problem may occur in that the receiving side cannot accurately extract the test information from the message packet received from the communication unit 110. In this case, the test on the battery may not proceed. Accordingly, the control unit 120 includes the classification information between the plurality of test information, so that the receiving side may accurately extract each test information.

The plurality of communication channels may include a first communication channel and a second communication channel.

Here, the first communication channel may be a communication channel in which the maximum data amount of the test information that may be transmitted at one time is set to a predetermined first standard amount or less. In addition, the second communication channel may be a communication channel in which the maximum data amount of the test information that may be transmitted at once is set to equal to or less than a predetermined second standard amount greater than the predetermined first standard amount.

Specifically, the first communication channel may be a channel in which the total data amount of the message packet that may be transmitted at one time is set to be less than the total data amount of the message packet that may be transmitted at one time in the second communication channel.

For example, the first communication channel may be a CAN channel, and the second communication channel may be a CAN FD channel. The CAN FD channel is a communication standard developed to compensate for the shortcomings of the CAN channel, and is a communication channel in which the maximum data amount that may be included is larger than that of the CAN channel. For example, if the maximum data amount that may be included in a packet transmitted through the CAN channel is 8 bytes, the maximum data amount that may be included in a packet transmitted through the CAN FD channel may be 64 bytes.

In addition, the communication unit 110 is connected to both the first communication channel and the second communication channel, and may communicate with an external device using both channels.

Figure 5:
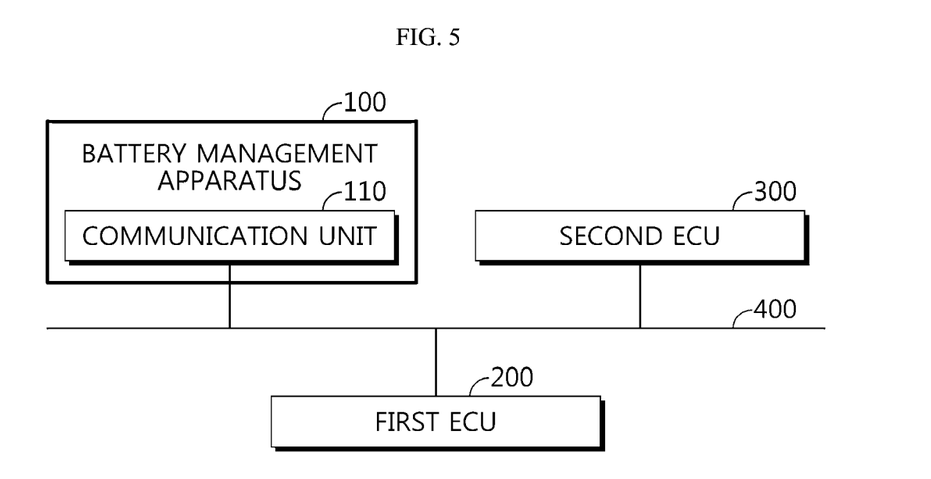
FIG. 5 is a diagram showing an exemplary configuration in which the battery management apparatus according to an embodiment of the present disclosure is connected to a communication BUS 400.

FIG. 5 is a diagram showing an exemplary configuration in which the battery management apparatus 100 according to an embodiment of the present disclosure is connected to a communication BUS 400.

Referring to FIG. 5, the battery management apparatus 100 may be connected to the communication BUS 400. In particular, the communication unit 110 may be connected to the communication BUS 400. That is, the communication unit 110 may receive an information provision request and transmit a message packet through the communication BUS 400.

A plurality of ECUs (Electronic Control Units) may be connected to the communication BUS 400. For example, the plurality of ECUs may be ECUs included in a vehicle. The type of the ECU is not limited, and the ECU may include ACU (Airbag Control Unit), BCM (Body Control Module), ECU (Engine Control Unit), PCM (Powertrain Control Module), TCU (Transmission Control Unit), ABS (Anti-lock Braking System), ESC (Electronic Stability Control), HPCU (Hybrid Power Control Unit), BMS (Battery Management System), and MCU (Motor Control Unit). In the embodiment of FIG. 5, it is illustrated that the first ECU 200 and the second ECU 300 are connected to the communication BUS 400, but the plurality of ECUs described above may all be connected in parallel to the communication BUS 400.

Referring to the embodiment of FIG. 5, the plurality of ECUs and the battery management apparatus 100 may be connected in parallel to the communication BUS 400. That is, the communication channel may not be a point-to-point type channel that connects each of the plurality of terminals (the ECUs and the battery management apparatus 100) one-to-one, but may be a multi master type channel in which the plurality of terminals are connected in parallel to one communication BUS 400.

Both a message packet corresponding to the first communication channel and a message packet corresponding to the second communication channel may be output to the communication BUS 400. In this case, the message packet corresponding to the first communication channel may be received from an ECU connectable to the first communication channel, and the message packet corresponding to the second communication channel may be received from an ECU connectable to the second communication channel. Since the battery management apparatus 100 may be connected to both the first communication channel and the second communication channel, it is possible to transmit and receive both the message packet corresponding to the first communication channel and the message packet corresponding to the second communication channel.

Therefore, since the battery management apparatus 100 may access the first communication channel and the second communication channel through the communication unit 110, there is an advantage of selecting the most appropriate communication channel to transmit the test information based on at least one of the data amount of the test information and the state of the plurality of communication channels.

Preferably, the control unit 120 may be configured to select the first communication channel among the plurality of communication channels when the data amount of the test information is equal to or less than the predetermined first standard amount.

For example, in the embodiment of FIG. 2, the predetermined first standard amount may be set to 4 bytes. In this case, if the data amount of the test information generated by the control unit 120 is 4 bytes or less, the generated test information may be included in the message packet of FIG. 2, so the control unit 120 may be configured to select the first communication channel.

That is, the control unit 120 may select any one of the plurality of communication channels according to whether the generated test information may be included in one message packet shown in FIG. 2.

In addition, the control unit 120 may be configured to select the second communication channel among the plurality of communication channels when the data amount of the test information exceeds the predetermined first standard amount and is less than or equal to the predetermined second standard amount.

As described above, the second communication channel may be a channel in which the data amount of the test information that may be transmitted at once is equal to or greater than the first standard amount and equal to or less than the second standard amount.

For example, in the embodiment of FIG. 4, it is assumed that the size of each test information is 4 bytes, and the number of test information generated by the control unit 120 is 12. That is, since 12 pieces of test information cannot be included in the message packet of FIG. 2, there is a problem in that the control unit 120 needs to generate 12 message packets when the first communication channel is selected. Accordingly, when the data amount of the test information exceeds the first standard amount, the control unit 120 may select the second communication channel. Referring to FIG. 4, since 12 pieces of test information can be included in one message packet, the battery management apparatus 100 may quickly transmit 12 pieces of test information through one communication.

In addition, the control unit 120 may be configured to check the state of each of the first communication channel and the second communication channel.

The control unit 120 may select the communication channel for transmitting the test information after first checking the state of each of the plurality of communication channels, without selecting the communication channel based only on the data amount of the generated test information.

For example, as in the embodiment of FIG. 5, the first ECU 200 and the second ECU 300 as well as the battery management apparatus 100 may be connected to the communication BUS 400. Accordingly, the control unit 120 may check whether there is a communication channel currently being used by another ECU among the first communication channel and the second communication channel by checking the state of each of the first communication channel and the second communication channel.

The control unit 120 may compare estimated transmission times expected to be required for the first communication channel and the second communication channel to transmit the test information, respectively.

For example, when the first communication channel is not used by another connected ECU but the second communication channel is used by another connected ECU, the control unit 120 may determine that the estimated transmission time of the test information using the first communication channel is shorter than the estimated transmission time of the test information using the second communication channel.

In addition, the control unit 120 may be configured to select a communication channel in which the estimated transmission time is short.

That is, the control unit 120 may select a communication channel through which the test information can be transmitted fastest to the receiving side, in consideration of not only the data amount of the test information but also the state of each of the plurality of communication channels.

As in the embodiment of FIG. 4, it is assumed that the number of test information generated by the control unit 120 is 12. In order to transmit the generated 12 pieces of test information, the control unit 120 needs to generate 12 message packets of FIG. 2 when using the first communication channel. However, when using the second communication channel, the control unit 120 needs to generate one message packet of FIG. 3. In this case, the control unit 120 may compare the estimated transmission time expected to be required when transmitting 12 message packets using the first communication channel with the estimated transmission time expected to be required when transmitting one message packet using the second communication channel.

If the first communication channel is not used by other connected ECUs, the control unit 120 may immediately output 12 message packets through the communication unit 110. However, if the second communication channel is used by other connected ECUs and the second communication channel also stores a plurality of message packets to be transmitted in a buffer thereof, the control unit 120 may transmit the generated 12 message packets using the first communication channel.

As such, the battery management apparatus 100 according to an embodiment of the present disclosure has an advantage of selecting a communication channel that can transmit the test information in the shortest time by checking the data amount of the generated test information and the state of each of the plurality of communication channels. That is, the battery management apparatus 100 has an advantage of communicating using a plurality of communication channels, as well as flexibly selecting a communication channel capable of providing test information to a receiving side fastest among the plurality of communication channels.

The battery management apparatus 100 according to the present disclosure may be applied to a BMS (Battery Management System). That is, the BMS according to the present disclosure may include the battery management apparatus 100 described above. In this configuration, at least some of components of the battery management apparatus 100 may be implemented by supplementing or adding functions of components included in a conventional BMS. For example, the communication unit 110 and the control unit 120 of the battery management apparatus 100 may be implemented as components of the BMS. In addition, in addition to the configuration included in the battery management apparatus 100, the BMS may further include a balancing unit for balancing at least one battery cell and an insulation resistance measuring unit for measuring an insulation resistance of the battery cell.

In addition, the battery management apparatus 100 according to an embodiment of the present disclosure may be included in a battery test system. For example, the battery test system may include the battery management apparatus 100 and a test device.

The battery management apparatus 100 may generate test information for testing the battery and transmit the generated test information to the test device. The test device may extract the test information by analyzing the message packet received from the battery management apparatus 100. In addition, the test device may perform a test on the battery based on the extracted test information.

Figure 6:
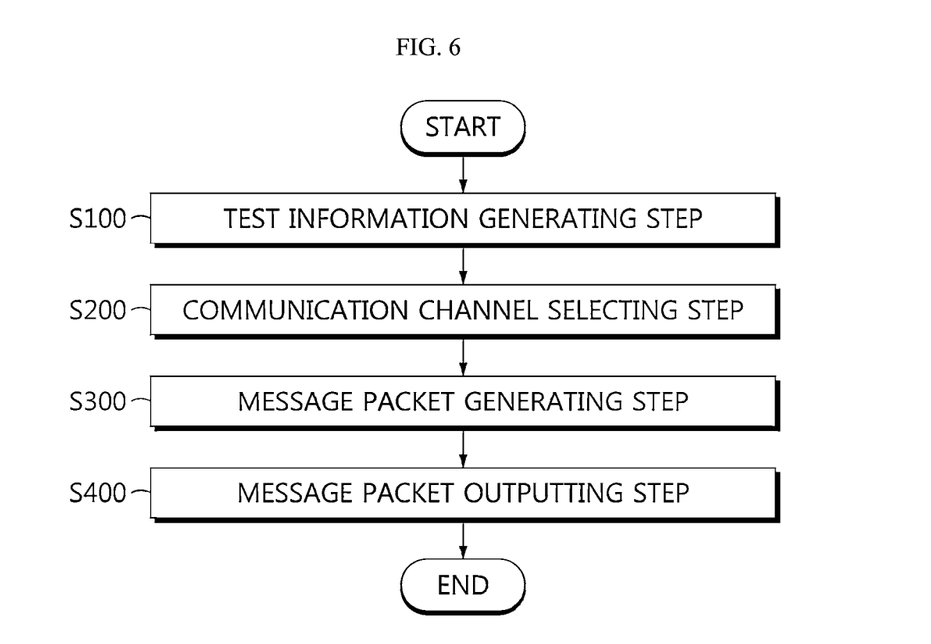
FIG. 6 is a diagram schematically showing a battery management method according to another embodiment of the present disclosure.

FIG. 6 is a diagram schematically showing a battery management method according to another embodiment of the present disclosure. Each step of the battery management method may be performed by the battery management apparatus 100.

Referring to FIG. 6, the battery management method may include a test information generating step (S100), a communication channel selecting step (S200), a message packet generating step (S300), and a message packet outputting step (S400). Hereinafter, for convenience of description, content overlapping with the previously described content will be briefly described or omitted.

The test information generating step (S100) is a step of generating one or more test information related to the battery, and may be performed by the control unit 120.

For example, in the embodiment of FIG. 4, the control unit 120 may generate a total of 12 pieces of test information.

The communication channel selecting step (S200) is a step of selecting any one communication channel among the plurality of communication channels based on at least one of the data amount of the generated test information and the state of the plurality of communication channels, and may be performed by the control unit 120.

For example, the control unit 120 may select any one of the first communication channel and the second communication channel based on at least one of the data amount of the generated test information and the state of the plurality of communication channels.

In the embodiment of FIG. 4, the control unit 120 may select the second communication channel in consideration of the data amount of 12 pieces of test information.

The message packet generating step (S300) is a step of generating a message packet including the test information based on the type of the selected communication channel and the data amount of the generated test information, and may be performed by the control unit 120.

For example, in the embodiment of FIG. 4, the control unit 120 may generate a message packet including the packet size information, the packet identification information, and the test information.

The message packet outputting step (S400) is a step of outputting the generated message packet to the selected communication channel, and may be performed by the communication unit 110.

Preferably, the message packet generated by the control unit 120 may be output to a communication channel through the communication unit 110. Here, the communication channel through which the message packet is output may be the communication channel selected by the control unit 120.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

100: battery management apparatus
110: communication unit
120: control unit
130: storage unit

What is claimed is:

1. A battery management apparatus, comprising:
   a communication circuit configured to output test information related to a battery; and
   a control circuit configured to:
      generate the test information related to the battery,
      select a communication channel among a plurality of communication channels based on at least one of a data amount of the generated test information and a state of the plurality of communication channels,
      generate a message packet including the generated test information based on a type of the selected communication channel and the data amount of the generated test information, and
      output the generated message packet to the selected communication channel through the communication circuit,
   wherein the control circuit is further configured to calculate a packet data amount required for the message packet based on the data amount of the generated test information and generate the message packet to include packet size information for the calculated packet data amount, packet identification information, and the generated test information, and
   wherein the packet identification information includes packet type information representing a type of the message packet and test request information for requesting a test for the battery.

2. The battery management apparatus according to claim 1,
   wherein the message packet includes a packet size information region in which the packet size information is recorded, a packet identification information region in which the packet identification information is recorded, and a data region in which the generated test information is recorded, and
   wherein the control circuit is further configured to determine the packet data amount based on the data amount of the packet size information, the packet identification information, and the test information.

3. The battery management apparatus according to claim 2,
   wherein the generated test information is provided in a plurality of pieces of test information, and
   wherein the control circuit is further configured to include classification information corresponding to the number of the plurality of pieces of test information in the data region so that the plurality of pieces of test information are classified from each other.

4. The battery management apparatus according to claim 1, wherein the plurality of communication channels include:
   a first communication channel in which a maximum data amount of the test information capable of being transmitted at once is set to be equal to or less than a predetermined first standard amount; and
   a second communication channel in which the maximum data amount of the test information capable of being transmitted at once is set to be equal to or less than a predetermined second standard amount that is greater than the predetermined first standard amount.

5. The battery management apparatus according to claim 4, wherein the control circuit is further configured to:
   select the first communication channel among the plurality of communication channels, if the data amount of the test information is equal to or less than the predetermined first standard amount; and
   select the second communication channel among the plurality of communication channels, if the data amount of the test information exceeds the predetermined first standard amount and is equal to or less than the predetermined second standard amount.

6. The battery management apparatus according to claim 4, wherein the control circuit is further configured to:
   check a state of each of the first communication channel and the second communication channel,
   compare an estimated transmission time for each of the first communication channel and the second communication channel to transmit the test information, and
   select one of the first communication channel and the second communication channel for which the estimated transmission time is shorter.

7. The battery management apparatus according to claim 1,
   wherein the test information is battery cell information based on at least one of voltage, current, and temperature of a battery cell, or is battery pack test information based on at least one of voltage, current, insulation resistance, and temperature of a battery pack including the battery cell.

8. The battery management apparatus according to claim 1,
   wherein the communication circuit is connected to a communication bus, and
   wherein the communication circuit is further configured to receive a request for information and to transmit the generated message packet through the communication bus.

9. The battery management apparatus of claim 1, wherein:
the plurality of communication channels includes a first communication channel and a second communication channel, and
the first communication channel is a CAN channel, and the second communication channel is a CAN FD channel.

10. The battery management apparatus of claim 1, wherein the control circuit is further configured to select the communication channel from among the plurality of communication channels based on the data amount of the generated test information and the state of the plurality of communication channels.

11. A battery test system, comprising the battery management apparatus according to claim 1.

12. A battery management method, comprising:
generating test information related to a battery;
selecting a communication channel from among a plurality of communication channels based on a data amount of the generated test information and a state of the plurality of communication channels;
calculating a packet data amount required for a message packet based on the data amount of the generated test information;
generating the message packet including the generated test information based on a type of the selected communication channel and the data amount of the generated test information, and including packet size information for the calculated packet data amount and packet identification information; and
outputting the generated message packet to the selected communication channel,
wherein the packet identification information includes packet type information representing a type of the message packet and test request information for requesting a test for the battery.

13. The battery management method of claim 12, wherein:
the plurality of communication channels includes a first communication channel and a second communication channel, and
the first communication channel is a CAN channel, and the second communication channel is a CAN FD channel.

14. A vehicle, comprising:
the battery management apparatus according to claim 1;
a communication bus; and
at least one electronic controller connected to the communication bus and configured to receive the generated message packet from the communication circuit of the battery management apparatus via the selected communication channel.

* * * * *